United States Patent [19]

Carpenter et al.

[11] Patent Number: 5,469,157
[45] Date of Patent: Nov. 21, 1995

[54] BARRICADE LIGHT WITH LIGHT EMITTING DIODE

[75] Inventors: Thom D. Carpenter; Lee R. Heimann, both of Elgin, Ill.

[73] Assignee: CBD, Inc., Elgin, Ill.

[21] Appl. No.: 194,414

[22] Filed: Feb. 10, 1994

[51] Int. Cl.[6] .................................................. B60Q 7/00
[52] U.S. Cl. ................. 340/908.1; 340/331; 340/815.45; 340/908; 362/800; 116/63 P
[58] Field of Search ...................................... 340/907, 908, 340/908.1, 331, 815.45; 362/382, 800; 116/63 P

[56] References Cited

U.S. PATENT DOCUMENTS

| | | | |
|---|---|---|---|
| 3,506,959 | 4/1970 | Nunn | 340/908.1 |
| 3,818,439 | 6/1974 | Maine | 340/331 |
| 3,867,718 | 2/1975 | Moe | 340/908 |
| 4,050,834 | 9/1977 | Lee | 424/16 |
| 4,132,983 | 1/1979 | Shapiro | 340/331 |
| 4,841,278 | 6/1989 | Tezuka et al. | 340/908.1 |
| 5,057,982 | 10/1991 | Hanami | 362/226 |
| 5,175,528 | 12/1992 | Choi et al. | 340/331 |
| 5,303,124 | 4/1994 | Wrobel | 362/20 |
| 5,313,187 | 5/1994 | Choi et al. | 340/331 |
| 5,313,188 | 5/1994 | Choi et al. | 042/331 |

*Primary Examiner*—John K. Peng
*Assistant Examiner*—Edward Lefkowitz
*Attorney, Agent, or Firm*—Mathew R. P. Perrone, Jr.

[57] ABSTRACT

A barricade light is retrofitted to receive a light emitting diode circuit. The circuit includes both a pulse activated switch and light sensitive switch for operation.

18 Claims, 9 Drawing Sheets

BARRICADE LIGHT WITH LIGHT EMITTING DIODE

This invention relates to a barricade light, and more particularly to a barricade light using a light emitting diode, with a remote-controlled, electronic, on/off switch.

BACKGROUND OF THE INVENTION

The safety barricade industry is comprised of various types of companies that deal primarily in construction related signs and roadway markings. These safety barricades are temporary reflective signs that usually have one of two types of lights attached on the top. These lights are used as a guide to show roadway lane changes and merges during construction, or to mark a temporary obstruction such as a hole in the ground.

A standard structure commonly used in a barricade light includes a stand, a light housing mounted on the stand and a lens covering the light housing. If the lens is removed, the light housing may be viewed. The known light housing includes a tubular member reaching upwardly with a socket inside designed to receive an incandescent bulb. Various circuitry permits that incandescent bulb to function.

There are two types of markets in which a company in the industry may operate. There is the rental market, which is usually a major market for big projects. Additionally, the sales market must be considered for smaller projects.

The rental market involves companies that rent these barricades to be used on large state or federal projects, such as road or bridge construction. These projects may often require many barricades for use over a long period of time. These rental units are issued with a flat fee service contract for the rental company to maintain their operation at all times.

This maintenance requires having service vehicles to deliver, set-up and pick-up barricades at each job site. An additional maintenance requirement includes patrolling the job site and replacing any malfunctioning or damaged units as needed. This maintenance includes replacing batteries in the barricade lights when necessary.

The sales of barricade lights are usually made to those companies that have a need for safety lights, but are willing to provide their own maintenance and service when needed. These purchasers are usually smaller construction companies or utilities that may only require a few barricades at any given job site. Another sales area is to other rental companies, that do not manufacture barricades and lights of their own.

The barricade lights, currently being employed on an industry wide basis, are designed around the use of an incandescent bulb as the light source. There are two types of lighted barricades being used, a steady burn unit and a flasher unit. The steady burn unit is a constant illumination light that is only seen from one direction.

The other type of light is a flasher unit, which is seen from both directions and is flashing at a pre-designated flash rate set according to industry standards. The lens is mounted in such a way that allows it to be rotated 360 degrees without affecting the bulb, since the bulb is omni-directional. An electronic circuit is currently used to control voltage to the bulb and, in the case of the flashing unit, also sets the flash rate.

Both types of lights customarily are powered by two six-volt zinc lantern batteries. In both cases an incandescent bulb is mounted on top of a electric candle that rises up from the battery compartment.

Although the industry has used these types of lights for many years, these lights are not without their problems. The industry has an average attrition rate of about 40 percent, primarily due to theft, abuse or accident. It is because of this attrition that the industry has been driven to lower the cost of producing these lights in order to minimize revenue losses.

This cost requirement causes a further problem in that it has resulted in using some materials in construction that effect the usefulness of the lights while in the field. The general unreliability of the current incandescent light used in the barricade leads to excessive field failure and maintenance costs. These problems result in lower profit for the supplying company.

One of the main reasons for field failure of the lights is the basic nature of incandescent bulbs. The average life of an incandescent bulb used under proper conditions is only 400 hours and the bulbs tend to burn out at different and very unpredictable rates. Also, filaments of bulbs break very easily especially if the unit is jarred or dropped. This is a problem in the very rugged environment of the construction areas these lights are most used.

Another big area in which these lights fail is the low cost mechanical switch that is used to turn the units off when the lights are not being used. It is accurately estimated that over 80 percent of the barricade lights that are repaired are done so because the switch to turn the barricade light on or off is not working properly.

Corroded contacts in this switch sometimes make it impossible for the light to be turned on when needed. Protection of the switch can limit access for repair or use of the switch. It is desired to have the switch accessible, durable and inexpensive.

While a barricade light, may have a light activated switch while in use, it is desired to be able to turn the barricade light off for storage. A defective switch not only makes the barricade light difficult to turn off and store, it also wastes battery power.

A third problem area surrounds the batteries used in the barricade lights. In order to keep costs down standard zinc carbon six volt batteries are used. The typical useful life for these batteries in this application is approximately 250 hours use for a steady burn light and 1,000 hours for a flasher unit. This battery life is a major concern because of the great number of man hours used to simply replace dead batteries while the units are in the field.

A related problem for the battery surfaces when the issue of disposal of these batteries is brought into the fold. The safety barricade industry is the single largest user of these types of batteries, and uses millions are of those batteries each year. Certain local and state authorities are beginning to look closely at the environmental impact of battery disposal.

All of the above reasons lead to high maintenance costs needed to service these barricade lights properly and keep them in working condition. These costs increase when a barricade light is taken out of service to be repaired. Not only is that light unable to be a revenue producer but the costs for extra parts and labor to complete the repairs can add up quickly.

Thus it may be seen that there are many key problems facing the manufacturers and users of the barricade lights. These problems are sufficient to require an immediate solution, while maintaining the required low cost of the barricade light.

The solution to the existing problems with incandescent lights in the barricade industry is the use of Light Emitting Diode (LED) technology. By replacing the incandescent bulb with a LED the major problems can be easily addressed. However there is more to it than simply taking an incandescent bulb out and plugging in a LED.

The use of a light emitting diode to replace an incandescent bulb is not a new one. Many electrical and mechanical issues need to be addressed to accommodate the unique characteristics of LED'S combined with the existing regulations of the safety barricade industry.

Of the electrical issues to be addressed, the primary issues are circuit durability, switch durability, and battery life; all while maintaining the low cost. To achieve durability while maintaining low cost can provide a great advantage to the industry.

If the use of the light emitting diode can be achieved within the current structure of a barricade light, the substitution thereof for the incandescent bulb is greatly simplified. Substantial modification of the barricade light is not required.

A light emitting diode also increases battery life, due to less current being required to produce the appropriate light. It is also a more durable light, because there is no filament to break.

SUMMARY OF THE INVENTION

Among the many objectives of this invention is the provision of a barricade light using a light emitting diode for lumination, with a remote-controlled, electronic, on/off switch.

Another objective of this invention is to provide a barricade light, which requires reduced battery power.

Yet another objective of this invention is to provide a barricade light, which is durable.

Still another objective of this invention is to provide a barricade light, which has a reliable switch therein.

Additionally, an objective of this invention is to provide a barricade light, which can have the incandescent light easily replaced with a light emitting diode.

Also, an objective of this invention is to provide a barricade light, which can more efficiently use a battery.

A further objective of this invention is to provide a barricade light, which reduces a battery disposal problem for a substantial environmental advantage.

Yet a further objective of this invention is to provide a barricade light, which has a reliable switch to turn the barricade light on or off.

These and other objectives of the invention (which other objectives become clear by consideration of the specification, claims and drawings as a whole) are met by providing a barricade light capable of receiving a light emitting diode circuit. The circuit includes both a pulse activated switch and light sensitive switch for operation.

BRIEF DESCRIPTION OF THE DRAWINGS

Throughout the figures of the drawings where the same part appears in more than one figure the same number is applied thereto.

DESCRIPTION OF PREFERRED EMBODIMENTS

The standard structure commonly used in a barricade light, for the purposes of this invention, is modified at the light housing to receive a solid state circuit board with at least one light emitting diode mounted thereon. The lens covering the light housing is removed to reveal the light housing.

The tubular member of the light housing is severed and the various circuitry for the incandescent bulb is removed. The lens covering the light housing has a top aperture on which one end of the printed circuit board may be secured. The other end of the printed circuit board is mounted in the remaining part of the tube. In order to incorporate the electronic circuit into that structure in a simple fashion, the tube is severed removing the light socket.

One end of the circuit board, preferably the one end at the upper signal input plate is secured at the aperture at the top of the lens. The base or lower signal input off switches fits into the remaining part of the candle thereby securing the circuitry in place. The lens is rotatable to position the light emitting diode as desired.

The barricade actuator control has an actuating button. The actuating button is fed by a nine volt battery or similar power source. The button is connected to an audio oscillator, which is in turn connected to an audio buzzer and an audio amplifier. The audio buzzer serves to indicate the activation of the barricade actuator control.

The audio amplifier amplifies the signal to the signal output plate. The signal output plate can be placed next to the upper signal input plate to activate or turn on the barricade lamp. The lower signal input plate is used in a similar fashion to turn the barricade lamp off for storage. The pulse activation or deactivation makes that switch more reliable.

Another area that needed special attention was the requirement for the lens to rotate 360 degrees without interference. This requires special mounting configuration due to the uni-directional viewing of light emitting diodes, which eliminates problems associated with the current method of mounting the bulb on a candle or support which protrudes upwardly through the bottom of the lens.

The main approach is to use one of the existing screws that hold the two lens pieces together. By mounting the printed circuit board from the top screw already in the lens and locating the light emitting diode in the proper place on the printed circuit board (PCB), the board rotates with the lens and always keeps the light emitting diode in the right position. Other structures are also operable.

The printed circuit board can be used both for a steady burn and flasher unit with only slight modifications. The circuitry is a basic oscillation circuit, with the appropriate modification for a steady burn or flash unit. The flash rate for the flasher unit is set to meet industry standards (presently set by the current Institute of Transportation Engineers (ITE) standards).

The steady burn unit is actually the same circuit with an increase in the oscillation rate to the point where it becomes undetectable to the human eye. This is important so that the light emitting diode may be driven to achieve maximum brightness yet still maintain its efficiency.

In order to accommodate for the need to have a bi-directional unit for the flasher, two light emitting diodes must be used facing opposite directions. The Steady burn unit only requires the use of a single light emitting diode due to its one direction viewing. Any suitable light emitting diode may be used. Preferred of the light emitting diodes are a super high intensity version manufactured by Hewlett Packard of Palo Alto, Calif.

A specially modified light emitting diode may be used in the circuit of this invention. This modification for the light emitting diode can compensate for the relatively small viewing angle of the light emitting diode. The existing plastic housing requires a much greater angle to provide a smooth light that fills the entire viewing area. This modification is accomplished by flattening the top of the diode and etching or otherwise treating the sides thereof.

An electronic switch mechanism in the PCB (printed circuit board) eliminates the need for a mechanical on/off switch. The electronic switch mechanism is also an integrated circuit. One typically useful circuit is a 4011 cmos IC (integrated circuit) for switching of power on and off. The board has two distinct copper areas, one at each end of the board.

The switch is activated by a separate hand held device that capacitively couples a brief signal, which is received by the circuit. Depending on the location of the hand held device, the circuit, and hence the barricade light can be turned on or off.

This completely solid state light emitting diode provides a light source that can be adapted to any existing lens housing without tooling changes to current plastic molds. This gives the barricade industry a product that can be retrofitted in old housings and used in new as well. Even more importantly, it addresses the major problems that exist and continue to be costly to those companies that service these barricade lights.

This device provides a long life for the light emitting diodes. Because of its solid state construction, under proper use light emitting diodes have an estimated life of 200 to 300 years and are unaffected by shock due to abuse. The new switch is electronic, and eliminates the corrosion and other problems of the mechanical switches.

Due to the circuit efficiency, the battery life current tests show that flasher unit can last approximately 4,000 hours and the steady burn unit can last approximately 1,000 hours. This is with two zinc six volt lantern batteries and does depend on the environment conditions. This is significantly longer then the few hundred hours of the current incandescent lamp life. Also, there is a environmental benefit from not dealing with disposal of as many old batteries in landfills. Reduced maintenance costs result from this improved structure and help in decreasing the overall cost for the barricade industry to do business.

The barricade actuator control (BAC) unit is a hand held remote control used to electronically switch the barricade light emitting diode oscillation circuit on and off. The BAC may be operated by a single nine volt battery or other suitable power source, and is designed to fit in the palm of an average sized hand.

The BAC accomplishes the switching by the generation of a capacitively coupled audio pulse. This pulse is not a radio frequency, but a clean audio signal with no discernible interference. This technique limits the range of the BAC to be used within approximately five centimeters of the barricade light housing.

This proximity requirement ensures that the switch operation is specific to a single barricade and not a group of barricades. Proximity permits a designated barricade light to be activated without affecting nearby lights.

The operation of the electronic switch begins with the depressing of a momentary switch to create the necessary pulse. The pulse is created by the use of a solid state device (U1). In solid state circuitry the term U refers to an integrated circuit device with the arabic numeral therewith serving to identify the particular oscillation device. The output of U1 is a square wave in the order of 2 kHz and is used to drive an audio piezo device. This is in order to verify to the operator that the BAC is working. The same output also drives transistor (Q1). In solid state circuitry the term Q refers to a transistor with the arabic numeral therewith serving to identify the particular transistor.

During the on time of the Q1 (a transistor), L1 (a coil) is saturated and as Q1 turns off, L1 and C3 (a capacitor) form a tuned parallel resinate circuit of about 17 KHz (kilohertz). L refers to a coil while the arabic numeral refers to the location of the coil. C3 refers to a particular capacitor, with the arabic numeral indicating the location of the particular capacitor.

Since this circuit is of a much higher impedance, the initiated voltage is also higher than the direct current (D.C.) saturation voltage. The resulting higher voltage allows smaller signal plate areas to be used to complete the pulse path thus setting the receiver in its desired state (on or off). The operator can define the switch state by the approximate location of the signal output plate with respect to the upper or lower signal receiver plates.

The barricade light emitting diode circuit is designed to maximize both the light output of the light emitting diode and the life of the battery. In order to achieve an light output that will meet industry standards, the circuit preferably uses light emitting diodes manufactured by Hewlett Packard (such as HLMA-D100, HLMA-C100) or equivalent.

These untinted, nondiffused, solid state lamps utilize aluminum indium gallium phosphide (AiInGaP) light emitting diode technology. This material has a very high luminous efficiency, capable of producing high light output over a wide range of drive currents, which makes them an excellent alternative for incandescent lamps. Typical luminous intensity at 20 mA is 1300 mcd with a maximum light emitting diode Junction Temperature of 110 degrees Centigrade. The batteries used are industry standard six volt zinc carbon lantern batteries.

The barricade light emitting diode circuit is comprised of two component parts, the control portion and the oscillation portion. The control circuit is used to determine operating mode of the oscillation drive control. A photo transistor is used to operate the drive control when darkness is present. The main purpose of this is to conserve battery life during daylight hours when the barricade lights are not required to operate. When light is present above a predetermined level, the drive control transistor (Q2) is on which clamps off the drive transistor (Q1). This clamping action results in an extremely low quiescent current that shuts down current to the light emitting diodes.

In addition, U1b (a integrator) in conjunction with U1c and R6 (a resistor) serve as feedback circuit providing historisis so that twilight conditions will not produce unstable or intermittent switching. This circuit also prevents a minimum change in light intensity (for example vehicle headlights) from effecting operation of the circuit. Also, R7 provides a voltage termination for U1b.

Following the standard pattern, the upper case U represents an integrated circuit, while the arabic numeral and lower case letter represent the location of the integrated circuit. The same applies to the upper case R, which represents a resistor, while the arabic numeral indicates the location in the circuit.

The barricade circuit uses a solid state switch for the purpose of turning the unit off when it is not being used, such examples are when the units are in storage or being transported to and from the field. This switch uses the capacitively coupled pulse created by the BAC unit to set the cross coupled gate U1a and U1d. The lower signal plate near the bottom of the lens sets the gate in a condition which causes Q2 to clamp driver Q1 off. The upper signal plate conversely sets the gate to the opposite condition which releases Q2 thus allowing driver Q1 to operate.

Protection diodes D3–D6 are used to protect the inputs to U1a and U1d. R9 and R10 are input terminators used for the above mentioned gates. D7 and D8 form an "or" gate that allows either the photo transistor switch or cross coupled gate to actuate Q2.

The oscillation portion of the circuit is used to turn D1 and D2 on and off at a pre-set frequency and duty cycle. This consists of Q1 and Q2 configured to create a simple transistor oscillation circuit of which frequency is determined by C1, R4, and R1. By changing the frequency and duty cycle, the oscillation can be sped up to a point more than the 30 Hz a human eye can perceive, this allows the appearance of a steady-on light source. The main purpose of the oscillation is to conserve battery life and allow the transient forward current to be much greater than the forward current of a steady on light emitting diode.

Figure 1:
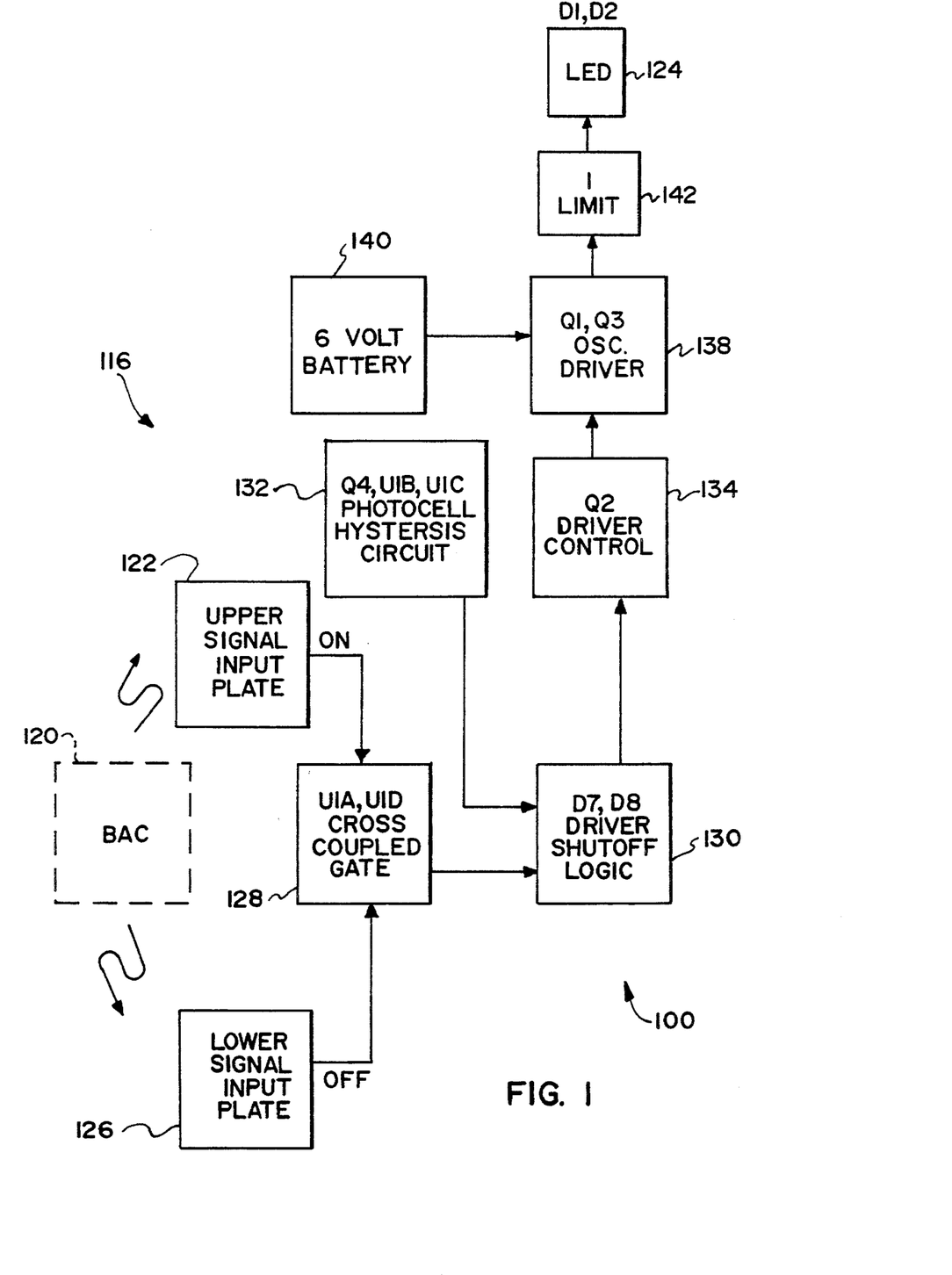
FIG. 1 depicts a block diagram of the barricade light 100 of this invention.

FIG. 1 depicts the barricade light 100 having a solid state circuit 116 for barricade light 100. Within the circuit 116, there is an upper signal input plate 122 for the purpose of receiving an on instruction for the light emitting diode 124. This on instruction activates the light emitting diode 124. The lower signal input plate 126 deactivates the light emitting diode 124, so that the barricade light 100 will not work until the upper signal input plate 122 is activated again by the barricade actuator control 120.

The barricade actuator control 120 is a pulse generator, with the pulse being received by either of the input plates. By being a pulse generator, the possibility of interfering with any other radio transmissions or getting permission from the Federal Communications Commission is avoided. Also, by using the pulse generator of this type, it is required to get extremely close, usually within five centimeters of the input plate in order to turn the light emitting diode 116 on or off. In this fashion, a random signal from a garage door opener or similar device cannot shut the barricade light 100 on or off.

Each signal input proceeds to a cross coupled gate 128. The cross coupled gate 128 is connected to a driver shutoff logic switch 130. The driver shutoff logic switch 130 is also connected to a photocell 132. If the upper signal input plate 122 is activated, the photocell 132 is permitted to operate. The driver control 134 is fed by the driver shutoff logic switch 130.

The driver control 134 feeds the oscillating driver 138. The oscillating driver 138 is powered by a six volt battery 140 or similar power source, which powers the rest of the circuit 116 and barricade light 100, but not the barricade actuator control 120. Oscillator driver 138 feeds into the limit switch 142, which is in turn connected to light emitting diode 124.

Figure 2:
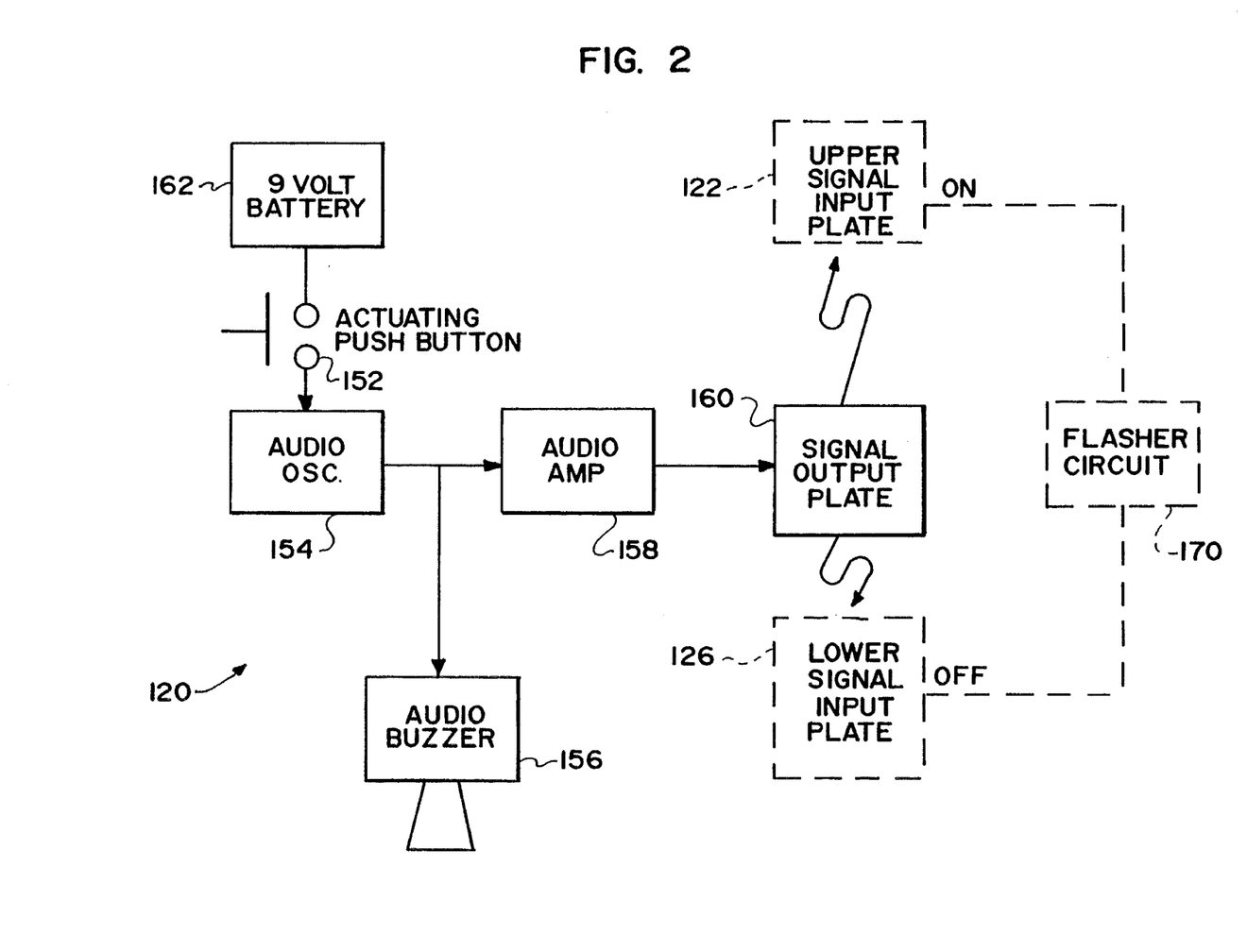
FIG. 2 depicts a block diagram of the barricade actuator control 120 of this invention.

In FIG. 2, the barricade actuator control 120 is shown in its circuit as having an actuating button 152. The actuating button 152 is fed by a nine volt battery 162 or similar power source. The actuating button 152 is then connected to an audio oscillator 154, which is connected to an audio buzzer 156 and an audio amplifier 158.

The audio Buzzer 156 serves to indicate the activation of the barricade actuator control 120. The audio amplifier 158 amplifies the noise put to the signal output plate 160. The signal output plate 160 can be placed next to the upper signal input plate 122 or the lower signal input plate 126 is depending on whether it is desired to turn either circuit of the light emitting diode 124 on or off.

Figure 3:
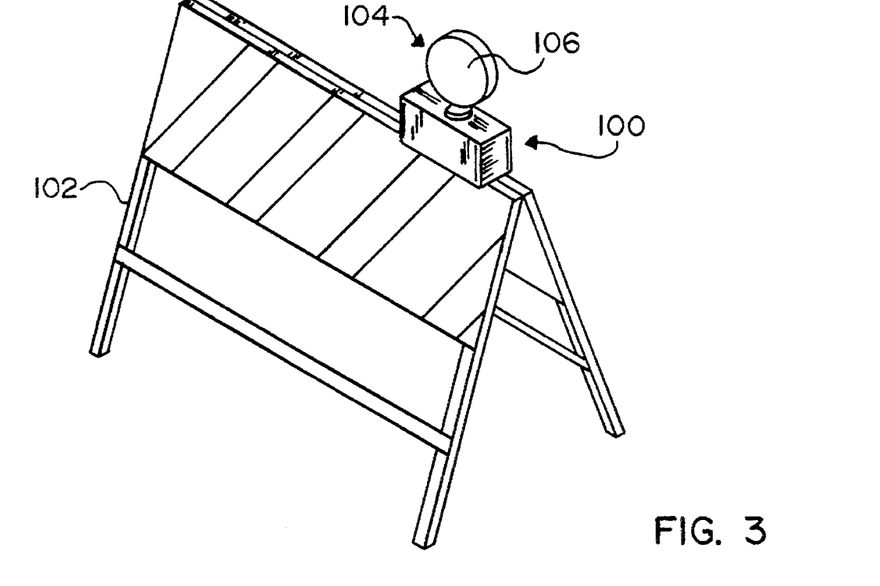
FIG. 3 depicts a perspective view of the barricade light 100 of this invention.

Considering now FIG. 3, the barricade light 100 includes a stand 102, a light housing 104 and a lens 106 covering the light housing 104. This is a standard structure commonly used in the barricade light 100. If the lens 106 is removed, the light housing 104 is viewed.

Figure 4:
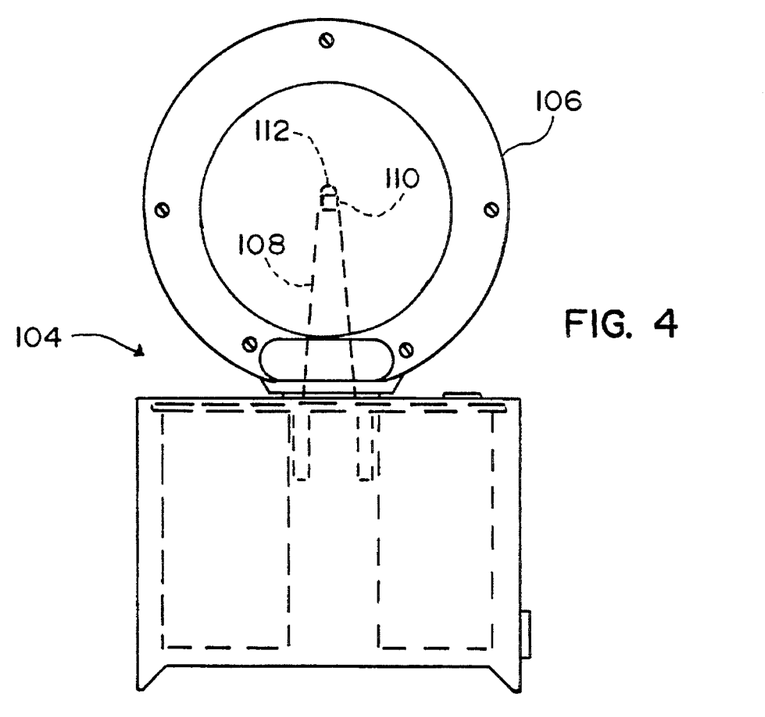
FIG. 4 depicts a front, plan view of the light housing 150 for the barricade light 100 as known in the art.

Adding FIG. 4 to the consideration, the light housing 104 includes a tubular member 108 reaching upwardly with a socket 110 inside designed to receive an incandescent bulb 112. Various circuitry permits that incandescent bulb 112 to function.

Figure 5:
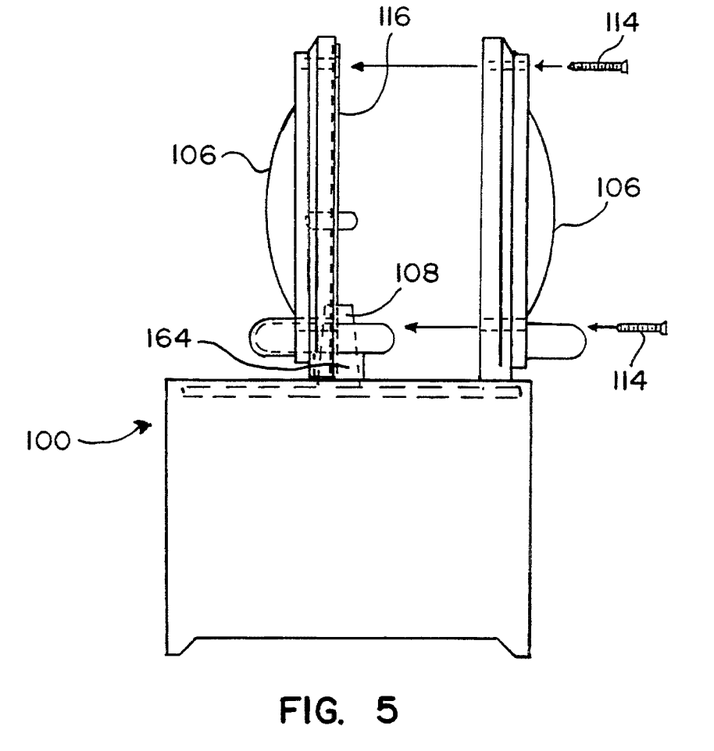
FIG. 5 depicts an exploded, side view of light circuit mount 160 used with a flashing circuit 170 as used in this invention.

Completing the structure with FIG. 5, in order to incorporate the electronic circuit 116 into that structure in a simple fashion, the tubular member 108 is severed removing the light socket 110. One end of the electronic circuit 116, preferably the on end at the upper signal input plate 122, is secured to the top of lens assembly 106 at a standard threaded assembly 114. The base or lower signal input plate 126 fits into the remaining part of the tube 104 thereby securing the circuit 116 in place. Other threaded assemblies 114 close the lens assembly 106.

The lens assembly 106 is rotatable to position the light emitting diode 124 as desired. As it is rotated, there is a slop mechanism 164, if desired, to prevent the complete 360 degree rotation of the lens assembly 106. This prevents stretching of the wires necessary to secure the circuit 116 to the six volt battery.

Figure 6:
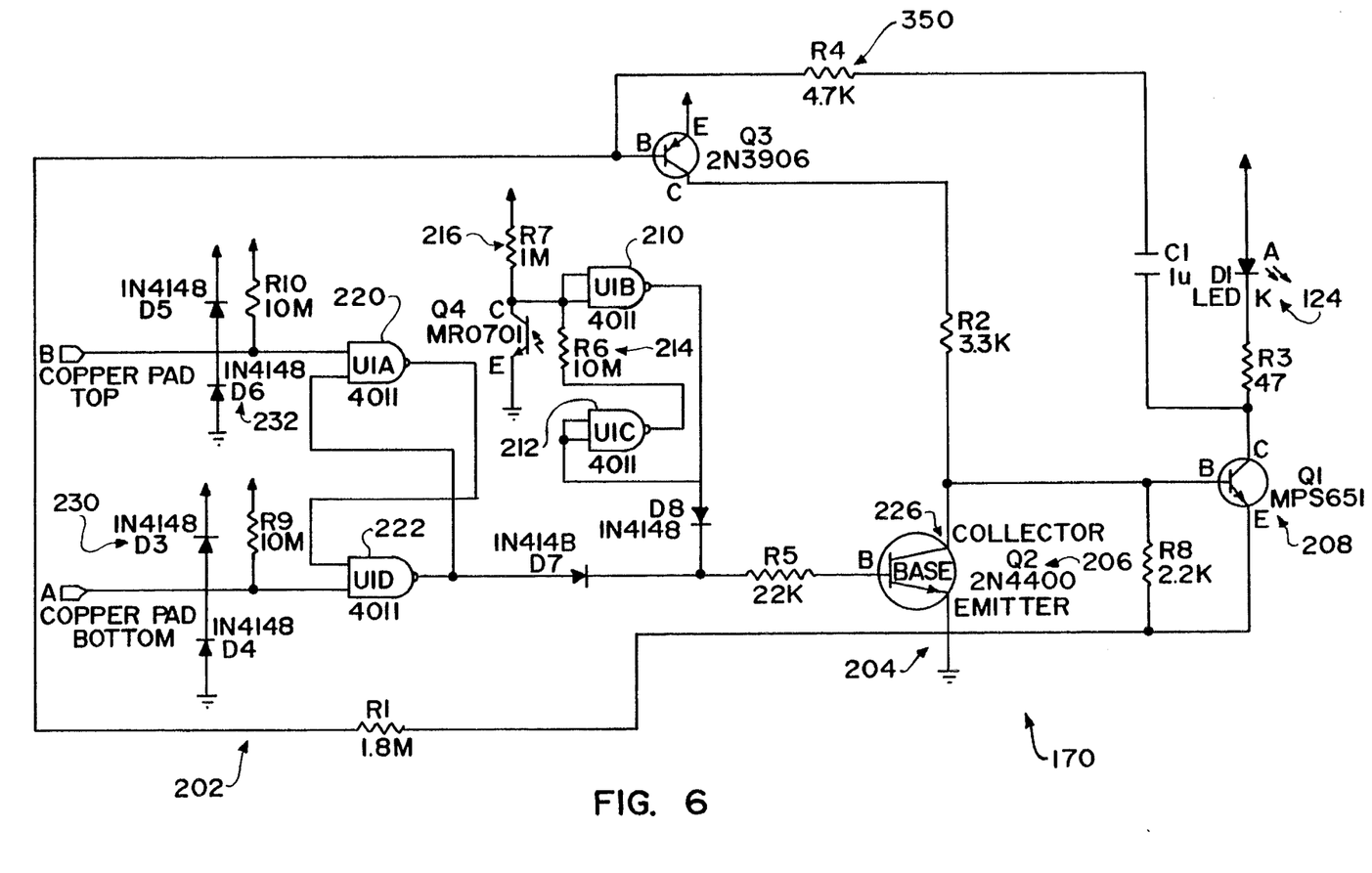
FIG. 6 depicts a flashing circuit 170 of a modified light emitting diode 124 in circuit diagram form.

The flashing circuit diagram 200 of FIG. 6 is a modification of circuit 116. The flashing circuit diagram 200 with the barricade light emitting diode 124 includes two component parts, the control circuit 202 and the oscillation circuit 204.

The control circuit 202 is used to determine operating mode of the oscillation drive control 138. A photo transistor 204 operates the drive control 206 during darkness. The main purpose of this is to conserve battery life during daylight hours when the barricade lights are not required to operate. When light is present above a predetermined level, the driver control 206 (Q2 or 134 of FIG. 1) is on, which clamps off the drive transistor 208 (or Q1). This results in an extremely low quiescent current that shuts down current to the light emitting diode 116.

In addition, first solid state device 210 (U1b) in conjunction with second solid state device 212 (U1c) and resistor 214 (R6) serve as a feedback circuit providing historisis so that twilight conditions will not produce unstable or intermittent switching. This circuit also prevents a minimum length of time change in light intensity (for example vehicle headlights) from effecting operation of the circuit. Also, resistor 216 (R7) provides a voltage termination for U1b for first solid state oscillation device 210.

The barricade circuit 202 uses a two part solid state switch with upper signal plate 122 for the purpose of turning the barricade light 100 on as desired, and lower signal plate 126 for the purpose of turning the barricade light 100 off when it is not being used. Typical examples of nonuse occur when the barricade light 100 or numbers thereof are either in storage or being transported to and from the field. This gate uses the capacitively coupled pulse created by the BAC unit 150 to set the cross coupled gate 218 of third gate 220 (U1a) and fourth gate 222 (U1d). The lower signal plate 126 near the bottom of the lens sets the cross-coupled gate in a condition which causes transistor 226 Q2 to clamp driver transistor 208 Q1 off.

The upper signal plate 122 conversely sets the gate to the opposite condition which releases Q2 thus allowing driver Q1 to operate. Protection diodes 230 and 232 (D3–D6) are used to protect the inputs to U1a and U1d. R9 and R10 are input terminators used for the above mentioned gates. D7 and D8 form an "or" gate that allows either the photo transistor switch or cross coupled gate to actuate Q2.

The oscillation portion of the circuit is used to turn D1 and D2 on and off at a pre-set frequency and duty cycle. This consists of Q1 and Q2 configured to create a simple transistor oscillation circuit of which frequency is determined by C1, R4, and R1. By changing the frequency and duty cycle, the oscillation can be sped up to a point more than the 30 Hz a human eye can perceive, this allows the appearance of a steady-on light source. The main purpose of the oscillation is to conserve battery life and allow the transient forward current to be much greater than the forward current of a steady on light emitting diode.

Figure 7:
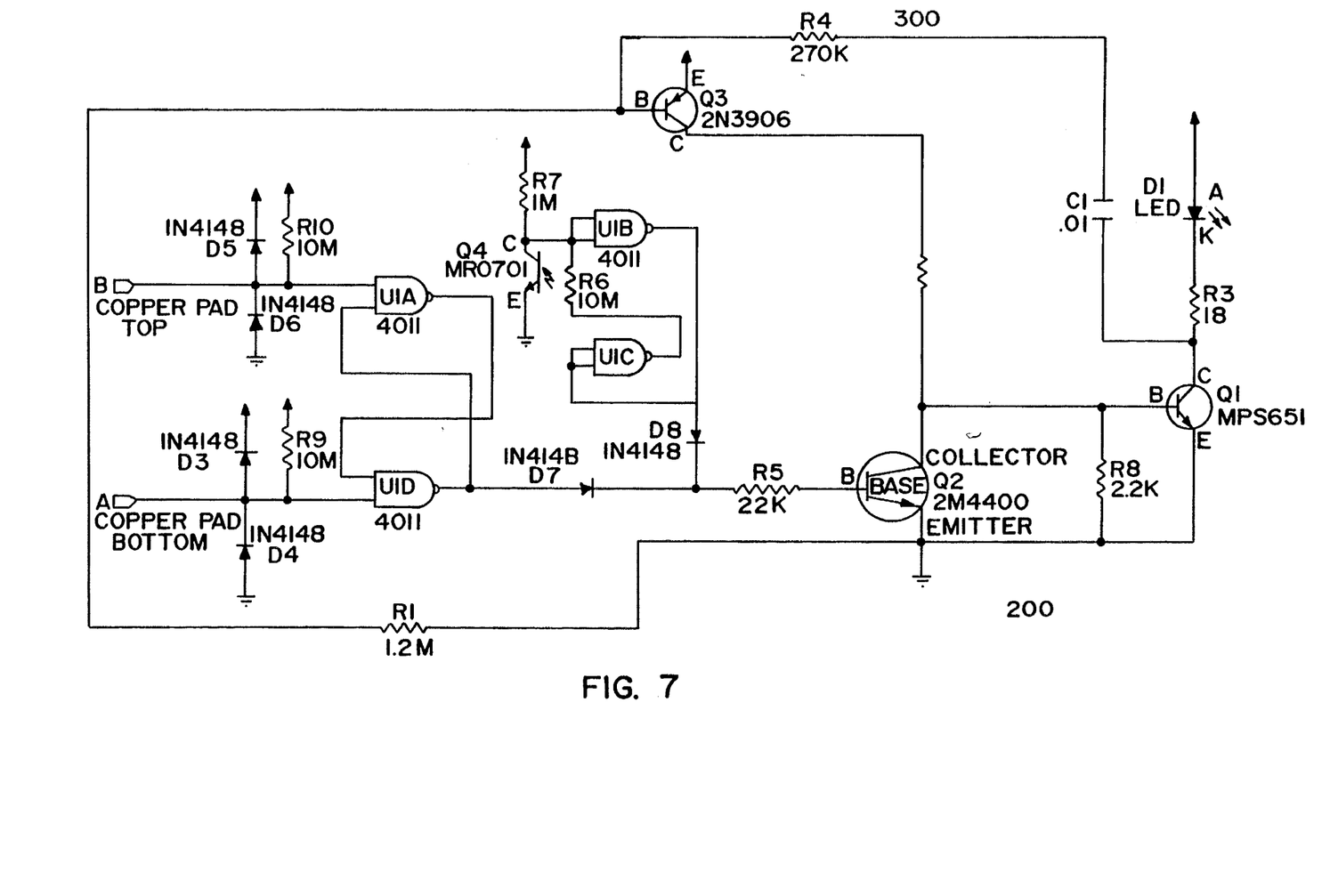
FIG. 7 depicts a steady circuit 200 of a modified light emitting diode 124 in circuit diagram form.

As shown in FIG. 7, the main difference between the LED flashing circuit 170 and the LED steady circuit 200 is found in element low resister 300 of the flasher and high resister 350 of the steady burn. The R1 and C1 cooperate with the element low resister 300 of the flasher and high resister 350 of the steady burn to lead to the respective flashing appearance or the steady burn appearance.

This change converts the LED flasher (flashing circuit 170) to the LED steady burn (steady circuit 200). Actually, the LED steady turn is flashing at a rate too high for the eye recognize that the light is actually flashing. This flashing aspect increases the life of the battery due to intermittent battery drain, instead constant battery drain. With the increased resistance of the LED flasher, the time between the cycles of the LED is sufficient for the human eye to detect the on and off aspects.

Figure 8:
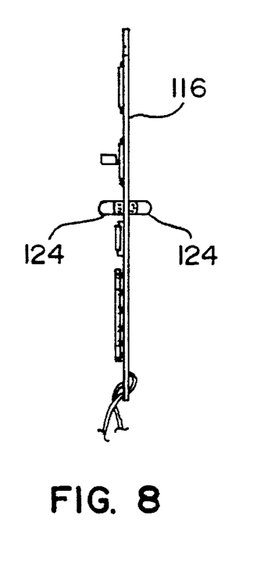
FIG. 8 depicts a standard light emitting diode 230.
Figure 9:
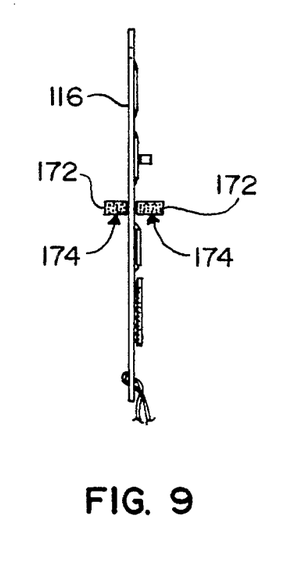
FIG. 9 depicts modified light emitting diode 220.

Considering now FIG. 8 and FIG. 9, FIG. 8 shows the light emitting diode 124 prior to modification. FIG. 9 shows the light emitting diode having the top 172 flattened and the side surface 174 sandblasted or otherwise roughened to diffuse the light output. In this fashion, the light is more efficiently used.

Figure 10:
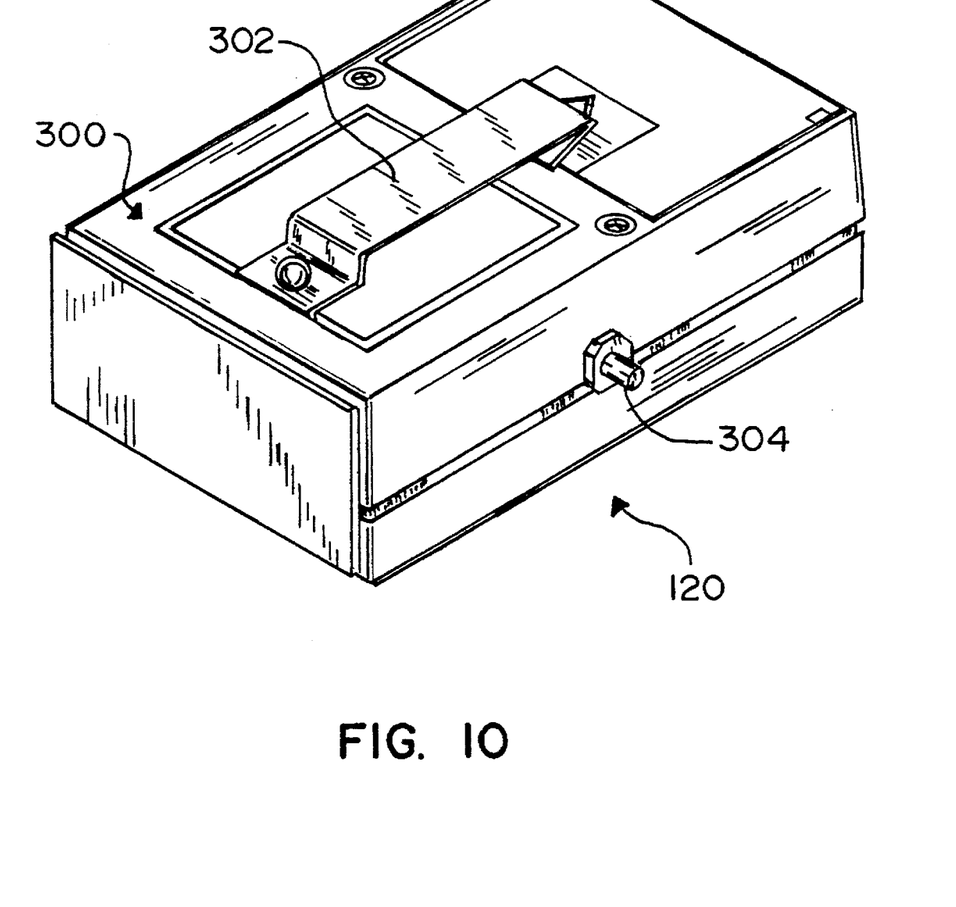
FIG. 10 depicts a top perspective view of the barricade actuator control 120 of this invention.
Figure 11:
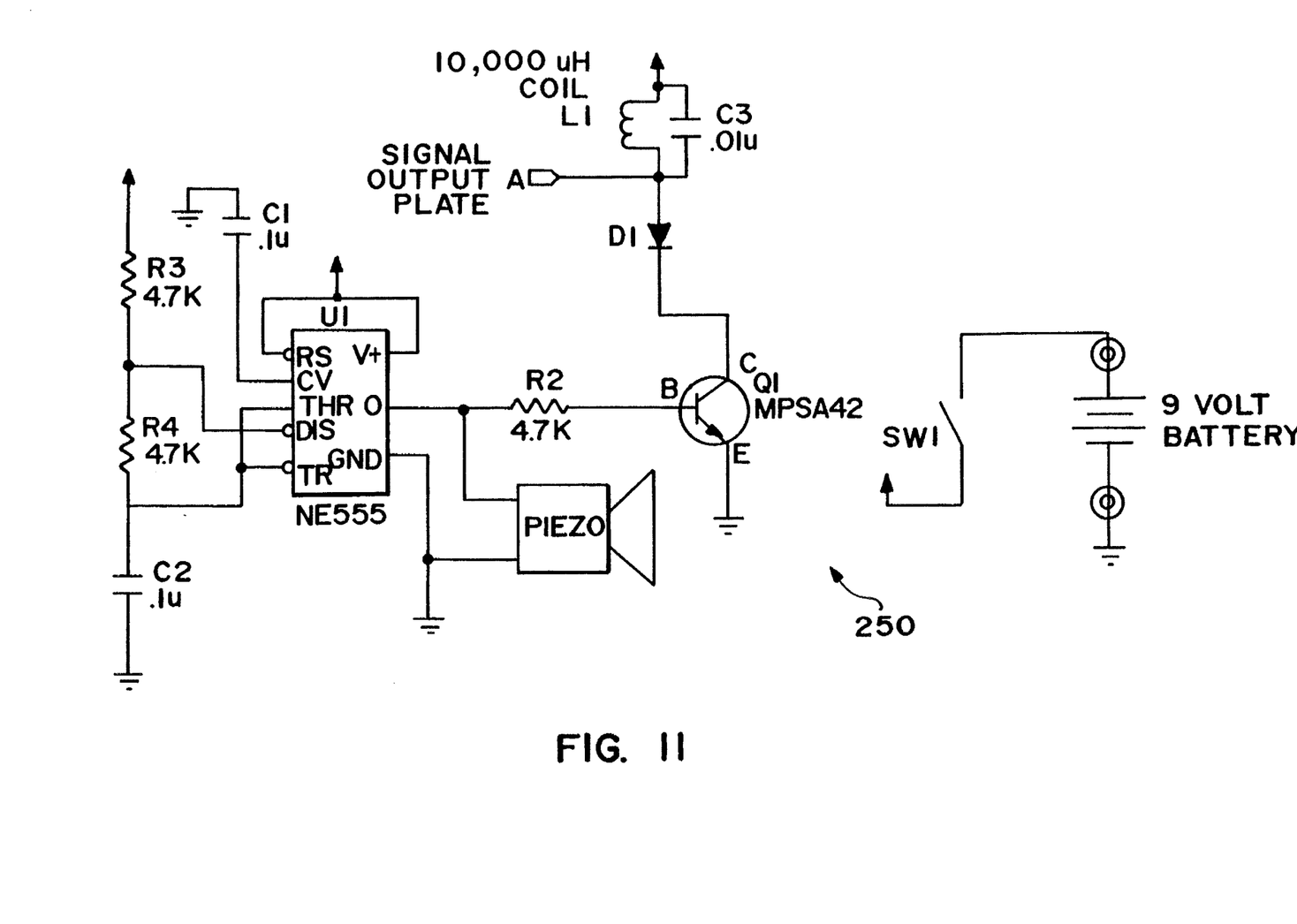
FIG. 11 depicts a barricade circuit 250 for barricade actuator control 120 of this invention.

As can be seen in FIG. 10 and FIG. 11, the barricade actuator control 120 is shown as having a handheld case 300 for barricade circuit 250. Case 300 includes a standard mounting clip 302 and a spring loaded button 304 for operating barricade actuator control 120. The barricade actuator control 120, as shown in FIG. 10, can be any rectangular box shaped device for holding the necessary circuit as described in FIG. 11.

FIG. 11 depicts barricade circuit 250 for barricade actuator control 120 of this invention. FIG. 11 includes the audio generating piezo combined with the circuit and the amplifier to achieve the desired results.

Figure 12:
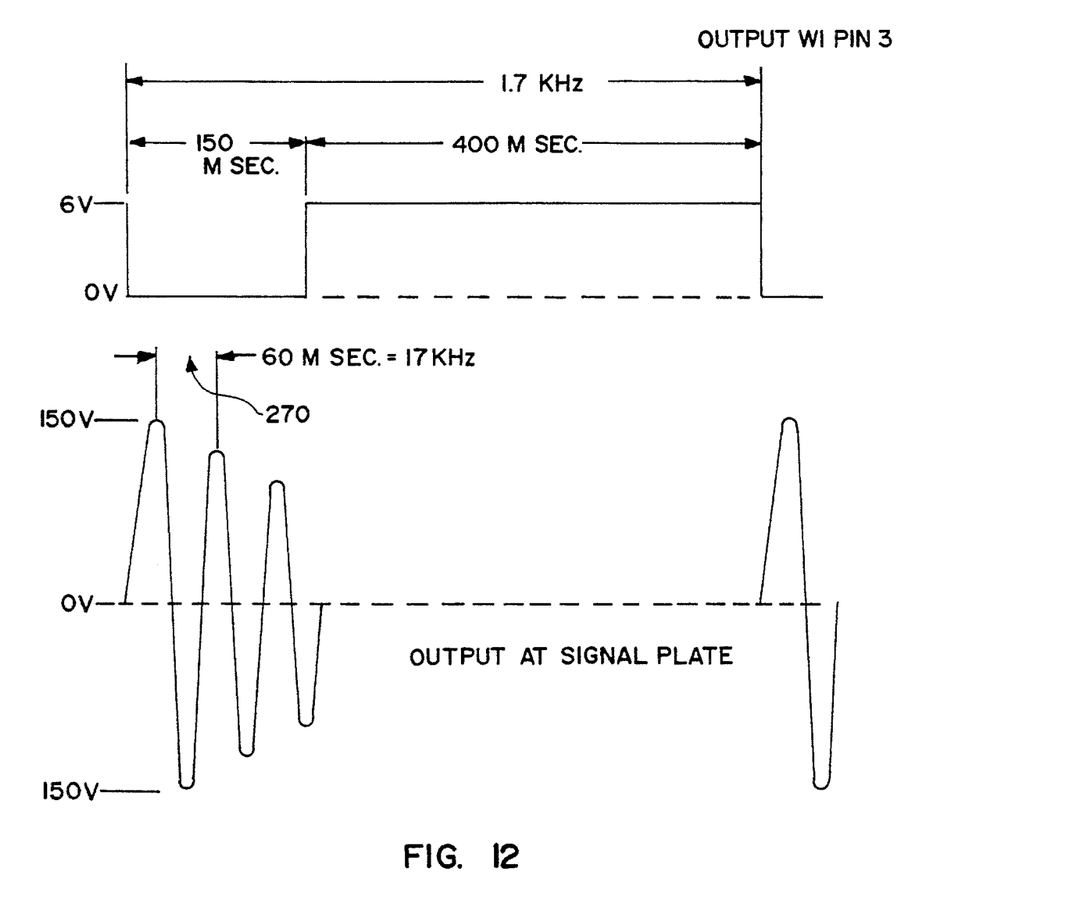
FIG. 12 depicts graph 270 showing the sine wave signal generated by barricade actuator control 120 of this invention.

In FIG. 12 is a graph 270 showing the sine wave generated by barricade actuator control 150. The narrow sine wave 270 explains why the barricade actuator control 150 works for the one barricade light 100 of this invention.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A barricade light for construction project comprising:
   a) a printed circuit board for use in the barricade light;
   b) a light emitting diode being mounted in the printed circuit board;
   c) the printed circuit board including a pulse activated switch for turning the light emitting diode off and
   d) the printed circuit board including a means to shut the light emitting diode off in daylight and on in the dark; and
   e) a means to operate the pulse activated switch to turn the barricade light off for the barricade light to be stored and on to activate the means to shut the light emitting diode off in daylight and on in the dark.

2. The barricade light of claim 1 further comprising the means to activate the pulse activated switch including a portable barricade actuator control.

3. The barricade light of claim 2 further comprising:
   a) the pulse activated switch including an upper signal input plate and a lower signal input switch;
   b) the printed circuit board being flat, rectangular, and thin;
   c) the printed circuit board having a first end and a second end;
   d) the upper signal input plate being situated at the first end; and
   e) the lower signal input switch being situated at the second end.

4. The barricade light of claim 3 further comprising:

a) a lens assembly for the barricade light;

b) the printed circuit board being secured vertically in the lens assembly;

c) the first end being secured at a top of the lens assembly; and d) the second end being secured at a bottom of the lens assembly.

5. The barricade light of claim 4 further comprising:

a) the upper signal input plate including the means to activate the pulse activated switch;

b) the upper signal input plate serving to turn the barricade light on when activated by the means to activate the pulse activated switch; and c) the lower signal input switch serving to turn the barricade light off when activated by the means to activate the pulse activated switch.

6. The barricade light of claim 5 further comprising:

a) a light mounting assembly for securing the printed circuit board in the lens assembly;

b) the light mounting assembly including an aperture in the top of the lens assembly for securing the first end of the circuit board in the lens assembly; and c) the light mounting assembly including a tubular member in bottom of the lens assembly to receive the second end.

7. The barricade light of claim 6 further comprising a rotating means for adjusting a position of the lens assembly.

8. The barricade light of claim 6 further comprising:

a) the means to activate the pulse activated switch including a portable barricade actuator control separate from the barricade light; and b) the barricade actuator control having an actuating button, a power source, an audio oscillator, an audio buzzer and an audio amplifier to create an activating pulse for the pulse activated switch.

9. The barricade light of claim 8 further comprising:

a) the actuating button serving to complete a circuit for the power source;

b) the power source completing a circuit to the audio oscillator;

c) the audio oscillator being connected to the audio buzzer and the audio amplifier;

d) the audio buzzer serving to indicate the activation of the barricade activator control;

e) the audio amplifier serving to selectively amplify a signal to the first end; and f) the audio amplifier serving to selectively amplify a signal to the second end.

10. The barricade light of claim 9 further comprising:

a) the printed circuit board including an oscillation circuit; and b) the oscillation circuit serving to set a flashing cycle for the light emitting diode.

11. The barricade light of claim 10 further comprising the oscillation circuit including means to set the flashing cycle for the light emitting diode at a flashing rate sufficiently high to be undetectable by a human eye.

12. The barricade light of claim 10 further comprising:

a) the oscillation circuit including means to set the flashing cycle for the light emitting diode at a flashing rate sufficiently low to be detectable by a human eye; and b) the printed circuit board including 2 light emitting diodes.

13. The barricade light of claim 10 further comprising:

a) the light emitting diode having a generally cylindrical shape;

b) the light emitting diode having a flattened, frosted top;

c) the light emitting diode having a frosted side; and d) the flattened, frosted top and the frosted side serving to expand a range of visibility for the light emitting diode.

14. The barricade light of claim 13 further comprising the barricade actuator control including means to activate the barricade light at a range of up to 5 centimeters.

15. The barricade light of claim 14 further comprising:

a) the printed circuit board including a transistor, a coil and a capacitor to form a tuned parallel resinate circuit; and b) the transistor saturating the coil and turning off to form the tuned parallel resinate circuit.

16. A barricade light for use in construction projects comprising:

a) a printed circuit board for the barricade light;

b) a light emitting diode being mounted in the printed circuit board;

c) the printed circuit board including a pulse activated switch for turning the light emitting diode off and on;

d) the printed circuit board includes means to shut the light emitting diode off in daylight and on in the dark;

e) a means to activate the pulse activated switch;

f) the pulse activated switch including an upper signal input plate and a lower signal input switch;

g) the printed circuit board being flat, rectangular, and thin;

h) the printed circuit board having a first end and a second end;

i) the upper signal input plate being situated at the first end;

j) the lower signal input switch being situated at the second end;

k) a lens assembly for the barricade light;

l) the printed circuit board being secured vertically in said lens assembly;

m) the first end being secured at a top of the lens assembly;

n) the second end being secured at a bottom of the lens assembly;

o) the upper signal input plate serving to turn the barricade light on when activated by the means to activate the pulse activated switch;

p) the lower signal input switch serving to turn the barricade light off when activated by the means to activate the pulse activated switch; and q) said means to operate the pulse activated switch to turn the barricade light off for the barricade light to be stored and on to activate the means to shut the light emitting diode off in daylight and on in the dark.

17. The barricade light of claim 16 further comprising:

a) a light mounting assembly for securing the printed circuit board in the lens assembly;

b) the light mounting assembly including an aperture in the top of the lens assembly for securing the first end of the printed circuit board in the lens assembly;

c) the light mounting assembly including a tubular member in bottom of the lens assembly to receive the second end;

d) the means to activate the pulse activated switch including a portable barricade actuator control;

e) the barricade actuator control having an actuating button, a power source, an audio oscillator, an audio buzzer and an audio amplifier to create an activating pulse for the pulse activated switch;

f) the actuating button serving to complete a circuit for the power source;

g) the power source completing a circuit to the audio oscillator;

h) the audio oscillator being connected to the audio buzzer and the audio amplifier;

i) the audio buzzer serving to indicate the activation of the barricade activator control;

j) the audio amplifier serving to selectively amplify a signal to the first end; and k) the audio amplifier serving to selectively amplify a signal to the second end;

l) the printed circuit board including an oscillation circuit;

m) the oscillation circuit for setting a flashing cycle for the light emitting diode;

n) the light emitting diode having a generally cylindrical shape;

o) the light emitting diode having a flattened, frosted top;

p) the light emitting diode having a frosted side;

q) the flattened, frosted top and the frosted side serving to expand a range of visibility for the light emitting diode;

r) the printed circuit board including a first transistor, a coil and a drive capacitor to form a tuned parallel resinate circuit; and s) the transistor saturating the coil and turning off to form the tuned parallel resinate circuit.

18. The barricade light of claim 17 further comprising:

a) the printed circuit board further including a drive control transistor to form a clamping action to clamp off the drive capacitor;

b) the clamping action providing an extremely low quiescent current to shut down current to the light emitting diode;

c) the printed circuit board further including an integrator in conjunction with the transistor a resistor to serve as feedback circuit providing historisis so that intermittent switching is avoided and a minimum change in light intensity avoids effecting operation of the printed circuit board;

d) the printed circuit board further including at least one protection diode to protect the transistor.

* * * * *